(12) United States Patent
Brown et al.

(10) Patent No.: US 7,171,562 B2
(45) Date of Patent: Jan. 30, 2007

(54) APPARATUS AND METHOD FOR PROVIDING A USER INTERFACE BASED ON ACCESS RIGHTS INFORMATION

(75) Inventors: Michael Wayne Brown, Georgetown, TX (US); Mark Joseph Hamzy, Round Rock, TX (US); Scott Thomas Jones, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 09/946,462

(22) Filed: Sep. 5, 2001

(65) Prior Publication Data

US 2003/0046548 A1    Mar. 6, 2003

(51) Int. Cl.
    *G06F 17/00* (2006.01)
(52) U.S. Cl. .................. 713/182; 713/150; 713/200
(58) Field of Classification Search ............. 713/182, 713/150, 200; 709/201
    See application file for complete search history.

(56) References Cited

U.S. PATENT DOCUMENTS

| | | | |
|---|---|---|---|
| 5,263,136 A | 11/1993 | DeAguiar et al. | 395/165 |
| 5,301,270 A | 4/1994 | Steinberg et al. | 395/161 |
| 5,315,504 A | 5/1994 | Lemble | 364/400 |
| 5,438,508 A | 8/1995 | Wyman | 364/401 |
| 5,613,001 A | 3/1997 | Bakhoum | 380/4 |
| 5,634,012 A | 5/1997 | Stefik et al. | 395/239 |
| 5,638,443 A | 6/1997 | Stefik et al. | 308/4 |
| 5,659,777 A | 8/1997 | Iwasaki et al. | 395/200.56 |
| 5,678,041 A | 10/1997 | Baker et al. | 395/609 |
| 5,765,152 A | 6/1998 | Erickson | 707/9 |

(Continued)

FOREIGN PATENT DOCUMENTS

EP     0887776     12/1998

(Continued)

OTHER PUBLICATIONS http://msnbc.msn.com/id/3078781/.*

(Continued)

*Primary Examiner*—David Jung
(74) *Attorney, Agent, or Firm*—Duke W. Yee; Marilyn Smith Dawkin; Wayne P. Bailey

(57) ABSTRACT

An apparatus and method for providing access rights information on computer accessible content are provided. The apparatus and method provide a mechanism through which access rights information is provided in association with information and content such that use of the information and content is controlled based on the access rights information. The apparatus and method include access rights information tags being associated with information and content. A web browser is provided with code, either in the web browser, or as a plugin application or browser extension, to process the access rights information and thereby control the usage of the associated information and content. In addition, an interface is provided through which a user may gain access to content that is associated with access rights information. The interface is generated based on the access rights information associated with the content and the access level of the user. Through this interface, the user may temporarily or permanently agree to terms for increasing the user's access level in order to have access to associated content.

36 Claims, 9 Drawing Sheets

U.S. PATENT DOCUMENTS

| | | | |
|---|---|---|---|
| 5,784,461 A | 7/1998 | Shaffer et al. | 380/21 |
| 5,794,006 A | 8/1998 | Sanderman | 395/500 |
| 5,813,009 A | 9/1998 | Johnson et al. | 707/100 |
| 5,838,790 A | 11/1998 | McAuliffe et al. | 380/4 |
| 5,974,445 A | 10/1999 | Pivnichny et al. | 709/203 |
| 5,983,324 A | 11/1999 | Ukai et al. | 711/137 |
| 6,005,939 A | 12/1999 | Fortenberry et al. | |
| 6,009,150 A | 12/1999 | Kamel | 379/88.22 |
| 6,112,192 A | 8/2000 | Capek | 705/59 |
| 6,119,108 A | 9/2000 | Holmes et al. | 705/40 |
| 6,128,021 A | 10/2000 | van der Meulen et al. | 345/428 |
| 6,192,380 B1 | 2/2001 | Light et al. | 707/505 |
| 6,195,647 B1 | 2/2001 | Martyn et al. | |
| 6,199,079 B1 | 3/2001 | Gupta et al. | 707/507 |
| 6,212,640 B1 | 4/2001 | Abdelnur et al. | 713/201 |
| 6,247,029 B1 | 6/2001 | Kelley et al. | 707/507 |
| 6,412,008 B1 | 6/2002 | Fields et al. | 709/228 |
| 6,418,439 B1 | 7/2002 | Papierniak et al. | 707/9 |
| 6,589,290 B1 | 7/2003 | Maxwell et al. | 715/507 |
| 6,662,340 B2 | 12/2003 | Rawat et al. | 715/507 |
| 6,732,179 B1 | 5/2004 | Brown et al. | 709/229 |
| 6,748,425 B1 | 6/2004 | Duffy et al. | |
| 6,813,603 B1 | 11/2004 | Groner et al. | |
| 6,834,306 B1 | 12/2004 | Tsimelzon | 709/228 |
| 6,938,022 B1 | 8/2005 | Singhal | |
| 2001/0032320 A1 | 10/2001 | Abdelnur et al. | 713/201 |
| 2002/0016922 A1 | 2/2002 | Richards et al. | 713/200 |
| 2002/0029194 A1 | 3/2002 | Lewis et al. | |
| 2002/0057260 A1 | 5/2002 | Mathews et al. | |
| 2002/0062342 A1 | 5/2002 | Sidles | |
| 2002/0083178 A1 | 6/2002 | Brothers | 709/226 |
| 2002/0095385 A1 | 7/2002 | McAvoy et al. | 705/51 |
| 2002/0103827 A1 | 8/2002 | Sesek | |
| 2002/0120864 A1 | 8/2002 | Wu et al. | |
| 2003/0037253 A1 | 2/2003 | Blank et al. | 713/200 |
| 2003/0046548 A1 | 3/2003 | Brown et al. | |
| 2003/0046578 A1 | 3/2003 | Brown et al. | 713/200 |
| 2003/0047607 A1 | 3/2003 | Swanson et al. | |
| 2003/0050919 A1 | 3/2003 | Brown et al. | 707/2 |
| 2003/0051039 A1 | 3/2003 | Brown et al. | 709/229 |
| 2003/0061567 A1 | 3/2003 | Brown et al. | 715/507 |
| 2003/0088517 A1 | 5/2003 | Medoff | |
| 2003/0130990 A1 | 7/2003 | Brown et al. | |
| 2003/0140312 A1 | 7/2003 | Mohan et al. | |
| 2003/0167202 A1 | 9/2003 | Marks et al. | 705/14 |
| 2003/0177248 A1 | 9/2003 | Brown et al. | 709/229 |
| 2003/0187806 A1 | 10/2003 | Banerjee et al. | |
| 2003/0188262 A1 | 10/2003 | Maxwell et al. | |

FOREIGN PATENT DOCUMENTS

| | | |
|---|---|---|
| JP | 10051482 | 2/1998 |
| KR | 99073076 | 10/1999 |
| WO | WO 96/24213 | 8/1996 |
| WO | WO 99/65219 | 12/1999 |
| WO | WO 00/77701 | 12/2000 |
| WO | WO 00/79756 | 12/2000 |

OTHER PUBLICATIONS

A conference user interface supporting different access rights to shared hypermedia Nakamura, T.; Yokota, Y.; Tarami, H.; Kambayashi, Y.; Konomi, S.; Computer Human Interaction, 1998. Proceedings. 3rd Asia Pacific Jul. 15-17, 1998 Page(s):38-43.*

Role-based security for configurable distributed control systems Hauf, M.; Schwarz, J.; Polze, A.; Object-Oriented Real-Time Dependable Systems, 2001. Proceedings. Sixth International Workshop on Jan. 8-10, 2001 Page(s):111-118.*

Protection reconfiguration for reusable software Jensen, C.D.; Hagimont, D.; Software Maintenance and Reengineering, 1998. Proceedings of the Second Euromicro Conference on Mar. 8-11, 1998 Page(s):74-80.*

Xavier, "XML based security for e-commerce applications", IEEE International conference on the Engineering of Computer Based Systems, Apr., 2001, pp. 10-17.

Bertino et al., "Securing XML documents with Author-X", IEEE Internet Computing, vol. 5, No. 3, Jun., 2001, pp. 21-31.

* cited by examiner

FIG. 5A

Structure of an ARI XML tag

```
        <Cost>       - contains amount to charge for using the object
        <Payee>      - identifies the entity to which the amount charged is to be paid
        <User Info>  - identifies source of user access level information
        <Time>       - length of time that this object is valid
510 ─── <Printing>   - options are:
                         allowed  - can always print
                         disabled - can never print ─── 520
                         onetime  - can print one time
        <Copy>       - options are:
                         allowed  - can always copy
                         disabled - can never copy
                         onetime  - can copy one time
        <Save>       - options are:
                         allowed  - can always save
                         disabled - can never save
                         onetime  - can save one time
        <Path>       - contains an array of points that define a polygon
        <Degrade>    - tells how a non or lower paying member would view the object.
                       options are:
                         <BitsPerPel> - lowers the color depth
                         <Resolution> - lowers the resolution of the image
                 515 ─<Monochrome> - turns the image into black and white
                         <Blur>       - blurs the image
                         <Crop>       - cuts out part of the image
                         <Alpha>      - superimposes another image over the object
                         <Overlay>    - Blocks out a section of the object
```

```
<ARI>
    <IMG SRC="http?://www.ibm.com/image.gif">
    <Degrade>
        <Resolution>72dpi</Resolution>
    </Degrade>
    <Printing>disabled</Printing>
    <Copy>disabled</Copy>
    <Save>disabled</Save>
```

```
    <Cost>0.01
        <Degrade>
            <Resolution>360dpi</Resolution>
        </Degrade>
    </Cost>

<Cost>0.10
        <Printing>onetime</Printing>
        <Degrade>
            <Resolution>360dpi</Resolution>
        </Degrade>
    </Cost>
```

540 {

```
    <Cost>1.00
        <Printing>allowed</Printing>
        <Copy>allowed</Copy>
        <Save>allowed</Save>
        <Degrade>
            <Resolution>max</Resolution>
        </Degrade>
    </Cost>
</ARI>
```

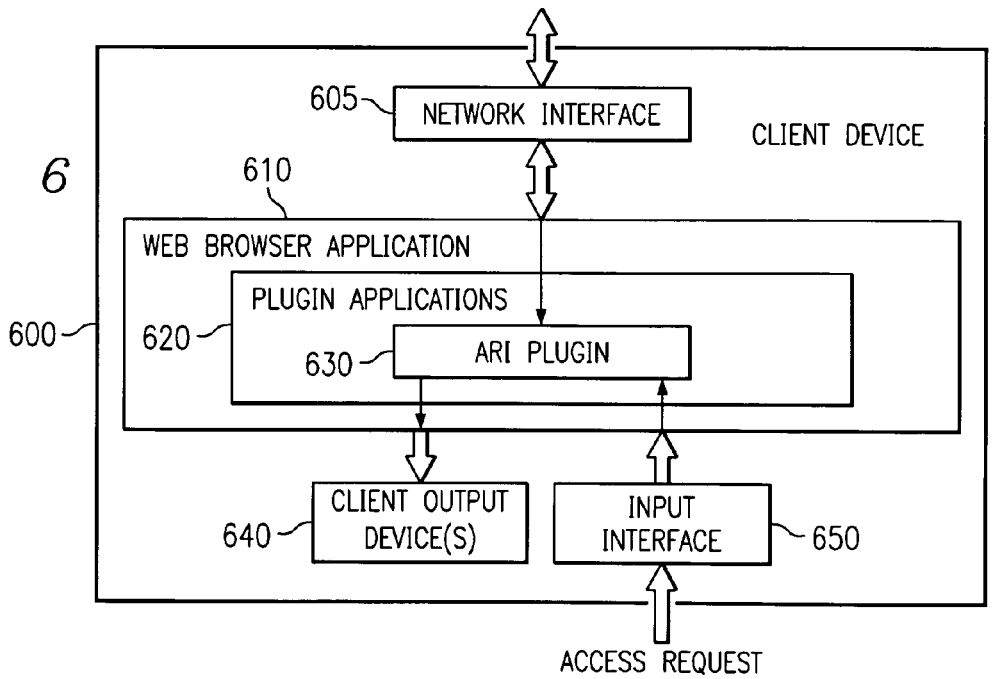

FIG. 6

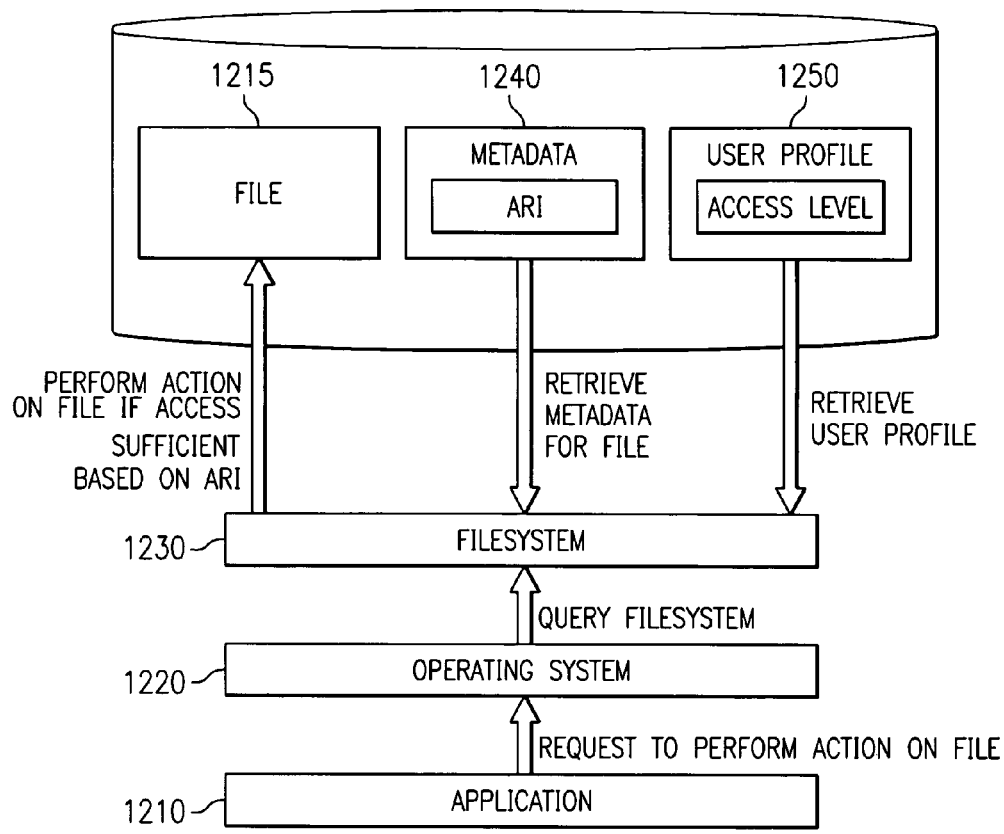
FIG. 12
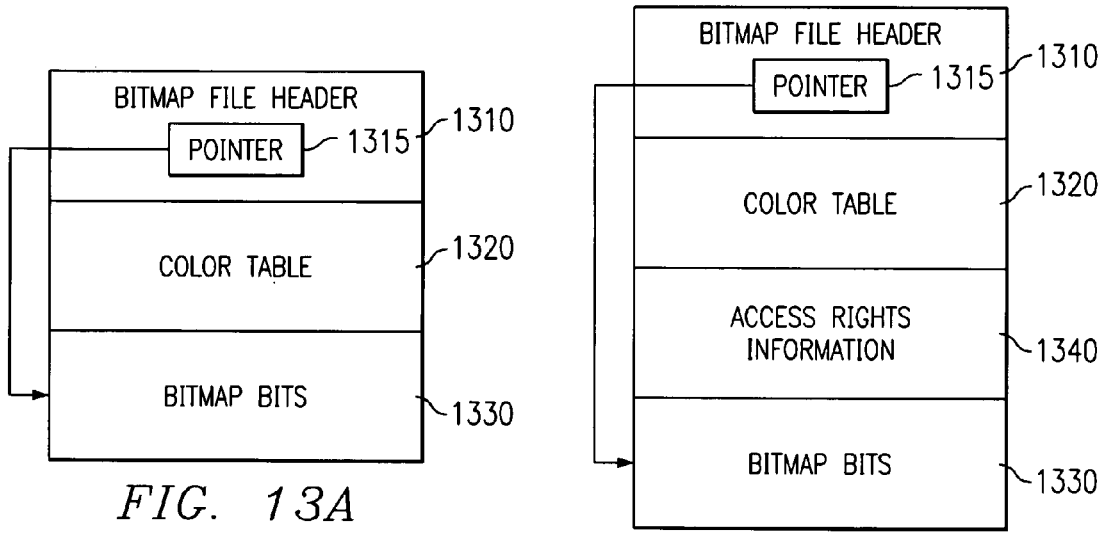
FIG. 13A
FIG. 13B

APPARATUS AND METHOD FOR PROVIDING A USER INTERFACE BASED ON ACCESS RIGHTS INFORMATION

RELATED APPLICATIONS

The present application is directed to similar subject matter as commonly assigned and co-pending U.S. patent application Ser. No. 09/946,441, entitled "Apparatus and Method for Providing access Rights Information in Metadata of a File", U.S. patent application Ser. No. 09/946,199, entitled "Apparatus and Method for Protecting Entries in a Form Using Access Rights Information", U.S. patent application Ser. No. 09/946,200, entitled "Apparatus and Method for Providing Access Rights Information in a Portion of a File", U.S. patent application Ser. No. 09/946,202, entitled "Apparatus and Method for Awarding a User for Accessing Content Based on Access Rights Information", and U.S. patent application Ser. No. 09/946,201, entitled "Apparatus and Method for Providing Access Rights Information on Computer Accessible Content," all of which are filed on even date herewith and are hereby incorporated by reference.

BACKGROUND OF THE INVENTION

1. Technical Field

The present invention is directed to an improved computing device. More specifically, the present invention is directed to an apparatus and method for providing access rights information on computer accessible content.

2. Description of Related Art

The Internet is an invaluable source of information and downloadable content in today's society. Much of this information is free to those who wish to obtain it. However, authors and creators of other information and content provided over the Internet may wish to control the way in which the information and content is used by those who access it.

Currently, there are no protections provided in web browser applications for limiting the way in which information and content downloaded from the Internet may be used by those that download it. For example, if a user downloads a web page from a web server, the user may right-click on the web page content, or portions thereof, and copy, print, or save the content. The user may then make use of the content in any manner the user wishes without regard for the rights of the creator of the content to control the way in which the content is used. For example, the user could take copyrighted images from one web page and use them in his/her own web page without the permission of the creator or owner of the copyrighted images.

Therefore, it would be beneficial to have an apparatus and method for providing protections against unauthorized use of information and content in a distributed computing environment.

SUMMARY OF THE INVENTION

The present invention provides an apparatus and method for providing access rights information on computer accessible content. The apparatus and method provide a mechanism through which access rights information is provided in association with information and content such that use of the information and content is controlled based on the access rights information.

The apparatus and method include access rights information tags, in one exemplary embodiment, being associated with information and content. A web browser is provided with code, either in the web browser, or as a plugin application or browser extension, to process the access rights information and thereby control the usage of the associated information and content. Such control may include enabling and/or disabling options in the web browser application.

The access rights information may be used to control access to content, identify how access to content may be obtained, monitor or keep a record of access to the content, and the like. The access rights information may be used in conjunction with an access level of a user to determine if the user is to be provided with access to the corresponding content.

In addition, the present invention provides an interface through which a user may gain access to content that is associated with access rights information. The interface is generated based on the access rights information associated with the content and the access level temporarily or permanently agree to terms for increasing the user's access level in order to have access to associated content.

Other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5A is an exemplary structure of an ARI extended markup language (XML) tag in accordance with the present invention;

FIG. 5B is an exemplary diagram of one embodiment of the access rights information according to the present invention;

FIG. 6 is a block diagram illustrating an exemplary web browser application according to the present invention;

FIG. 12 is an exemplary block diagram illustrating an embodiment of the present invention implemented in a filesystem;

FIG. 13A illustrates a standard OS/2 bitmap file; and

FIG. 13B illustrates the same OS/2 bitmap file as in FIG. 13A augmented to include the access rights information of the present invention.

DETAILED DESCRIPTION OF THE PREFERRED EMBODIMENT

Figure 1:
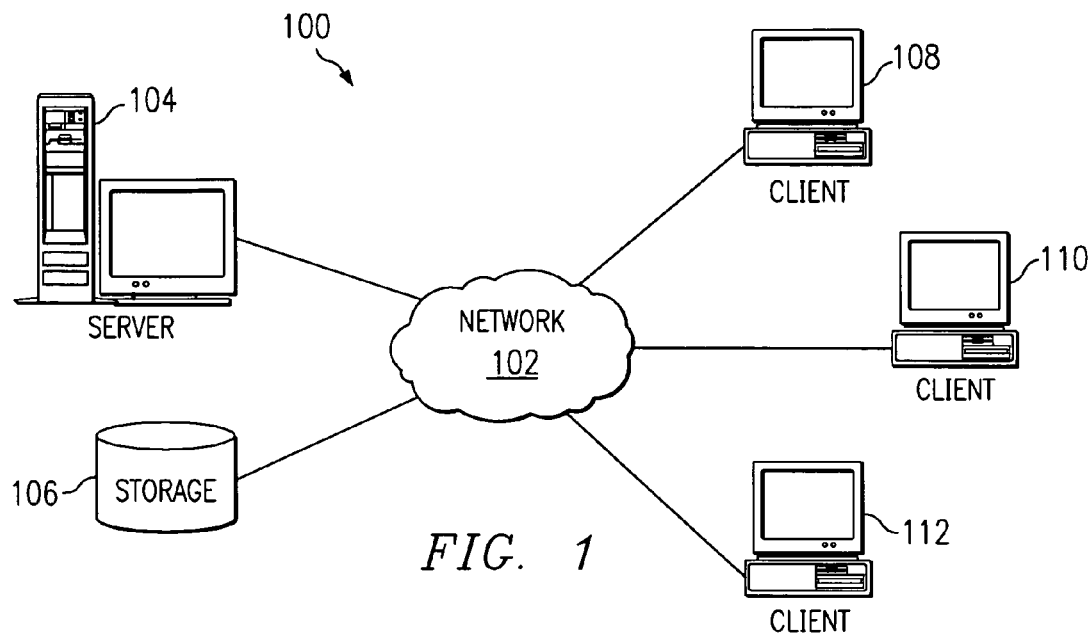
FIG. 1 is an exemplary diagram illustrating a distributed data processing system in accordance with the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. The server 104 may be any type of server capable of providing content to a client device. The server 104 preferably makes use of the present invention by including access rights information (ARI) in association with the content that the server 104 provides to client devices.

In addition, clients 108, 110, and 112 are connected to network 102. These clients 108, 110, and 112 may be, for example, personal computers, personal digital assistants, (PDAs), cellular telephones, wireless two-way pagers, network computers, or any other computing device capable of communication via the network 102. In a preferred embodiment, these client devices 108, 110 and 112 are modified to include software instructions for implementing client side operations of the present invention, as described hereafter. However, the present invention is not limited to such an embodiment and all of the operations of the present invention may be implemented in server 104 without departing from the spirit and scope of the present invention.

In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Each of the client devices 108–112 are preferably equipped with browser applications that either include in the code of the browser application, or in plugin applications to the browser application, software code for making use of access rights information (ARI) in accordance with the present invention. The ARI provides information to the browser application or plugin application regarding the various functions that may be performed on the content associated with the ARI. In other words, the ARI controls the way in which the content may be used by users of client devices to which the content is provided.

In a preferred embodiment of the present invention, a user of a client device may request content from a server using the web browser application resident on the client device. Such mechanisms for requesting content are well known in the art and may include, for example, inputting a Uniform Resource Locator (URL), Internet Protocol (IP) address, or the like, into a field of the web browser software interface.

The server receives the request for content from the client device and provides the requested content, if possible, along with the associated ARI to the client device. Upon receiving the requested content, the web browser application parses the content to determine how to present the content on the client device. In parsing the content, the browser application encounters the ARI associated with the content and processes it accordingly either using its own code or invoking a plugin application, depending on the particular implementation of the present invention.

Based on the processing of the ARI, various functions may be enabled and/or disabled in the web browser application. For example, if the ARI indicates that the content cannot be printed by the client device, the print option in the web browser application may be disabled. This may involve removing or graying out the option in the virtual buttons in the web browser software interface, removing or graying out the option in any pop-up menus (such as the pop-up menu provided when a user "right-clicks" the computer mouse), or any other manner by which functions may be disabled. Conversely, virtual buttons and menu options may be enabled or added depending on the access rights identified in the ARI. In this way, the ARI may be used by providers of content to control the way in which the content may be used by receivers of the content. The mechanisms for enabling and/or disabling functions in a web browser are generally known in the art and thus, a detailed explanation is not provided herein.

Figure 2:
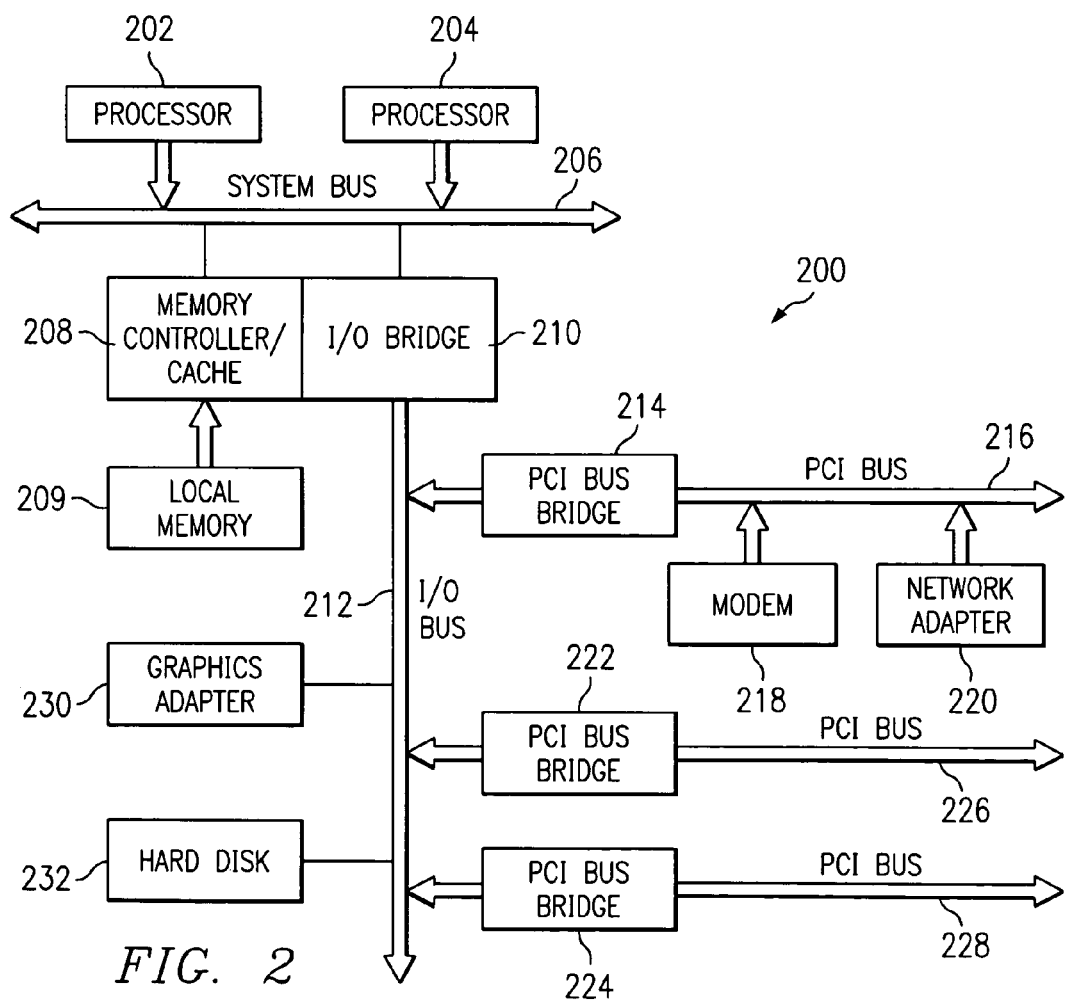
FIG. 2 is an exemplary diagram illustrating a server data processing device in accordance with the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
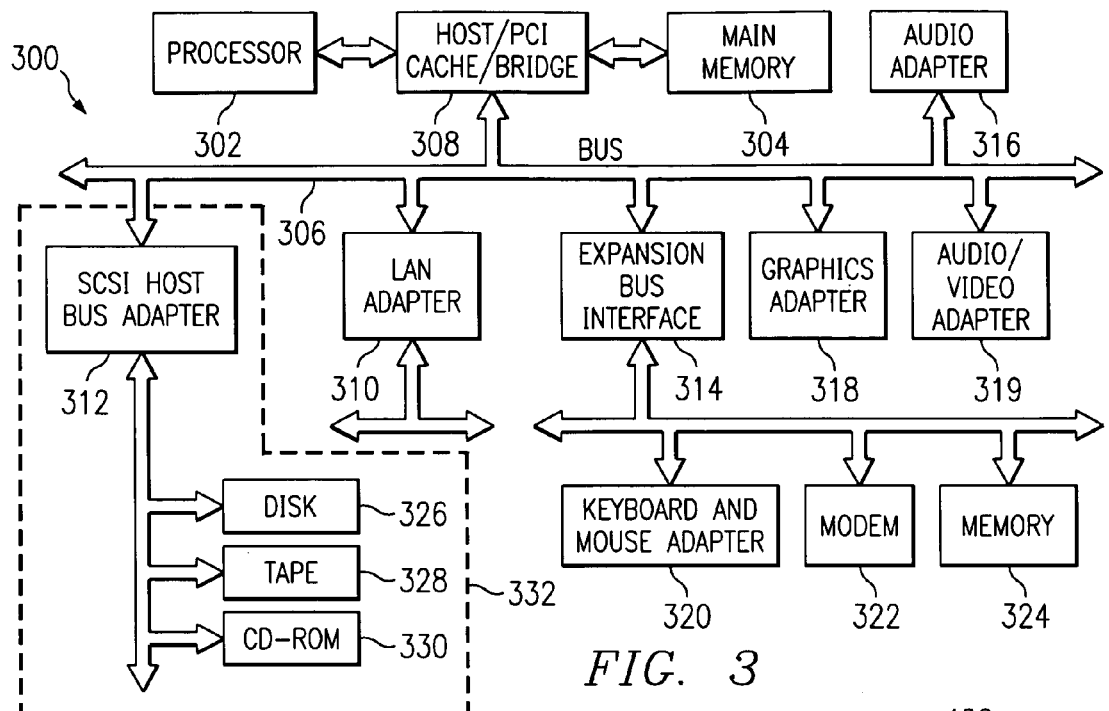
FIG. 3 is an exemplary diagram illustrating a client data processing device in accordance with the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

As mentioned above, the present invention provides a mechanism by which access rights may be assigned to information and content in a manner that allows browser applications to limit use of the information and content based on the access rights assigned. The present invention may be implemented in a number of different ways. The following descriptions of the preferred embodiments of the present invention will outline the most preferred embodiments by which the present invention may be implemented. However, it should be noted that these embodiments are only exemplary and any mechanism for assigning access rights to information and content such that a browser application is capable of processing and using the access rights to control usage of the information and content, may be used without departing from the spirit and scope of the present invention.

Figure 4:
FIG. 4 is an exemplary diagram of a web page in accordance with the present invention.

FIG. 4 is an example diagram of a web page that may be stored on a server, such as server 104, and may be provided to a client device, such as client device 108, upon request. The exemplary web page 400 consists of text information 410, and images 420–430. The creator of the web page 400 wishes to control the manner in which the web page and its contents are used by those that download the web page to their client devices. In the prior art, there is no mechanism for controlling the usage of web pages and their contents once they are downloaded to the client device. That is, a user may simply right-click a computer mouse button and be provided with a pop-up menu allowing the user to copy, save as, print, etc. the information and content from a downloaded web page without any regard for the rights of the creator of the web page.

With the present invention, however, the web page 400 as a whole, and/or one or more components 410–430 of the web page 400 may have access rights information (ARI) tags associated with them detailing the access rights provided to users of client devices that download the web page 400. The ARI tags, in a preferred embodiment, are inserted into the HTML code of the web page in appropriate positions so as to be associated with one or more components of the web page. For example, the ARI tag may be inserted in a portion of the web page HTML corresponding to an image in the web page and thus, be used to control the access to the associated image.

When a user of a client device attempts to perform a function on the web page, or a portion thereof, the web browser application on the client device processes the ARI tags associated with the web page or portion thereof, and determines what options are available to the user of the client device and/or whether the function attempted by the user is permitted based on the ARI tag. If the function is permitted, the corresponding menu option or virtual button will be enabled and the user is allowed to perform the function. If the function is not permitted, the menu option or virtual button may be disabled, e.g., by removing the option or button, graying out the option or button, or the like. In this way, the creator or owner of the web page content may dictate how the content is used by persons downloading it from the server.

FIG. 5A is an exemplary structure of an ARI extended markup language (XML) tag in accordance with the present invention. As shown in FIG. 5A, the ARI tag has a structure that is comprised of one or more identifiers of usage restrictions 510 for an associated object, e.g., text, image, field, etc. of a portion of content. These various identifiers 510 have values 520 that designate the particular usage restrictions for the associated object.

The particular exemplary ARI tag shown in FIG. 5A is intended to be associated with an image. The ARI tag includes identifiers <Cost>, <Payee>, <user info>, <Time>, <Printing>, <Copy>, <Save>, <Path> and <Degrade>. In addition, the identifier <Degrade> includes sub-identifiers 515 for identifying the manner by which the quality of an associated image may be degraded based on the amount paid, if any, by the user for use of the image.

The <Cost> identifier is used in the ARI tag for designating the amount of money that is to be charged for use of the associated image. This amount may be designated as a flat rate or a variable rate. In the case of a variable rate, various levels of image quality may be provided based on the amount of money that is paid by the user of the associated image.

The <Payee> identifier is used in the ARI tag to designate the entity to which the amount charged is paid. This identifier may have values that identify the entity, an account associated with the entity, and the like.

The <user info> tag identifies a location where a user profile may be obtained in order to determine the user's access level, as discussed in greater detail hereafter. This location may be local or remote to the system implementing the ARI tag of the present invention. For example, a central repository for user access level profiles may be provided that is accessible via a distributed network, such as the Internet. The address for this central repository would be provided in association with the <user info> tag in the ARI tag.

The <Printing>, <Copy>, and <Save> identifiers are used in the ARI tag to identify whether printing, copying and saving the associated image are permitted. These identifiers 510 may have values 520 indicating that the printing, copying, and/or saving may always be performed, never performed, or performed a limited number of times, such as only once. Of course, other values for these identifiers may be included without departing from the spirit and scope of the present invention. For example, the values 520 may be variable based on the amount paid by the user for use of the associated image.

The <Path> identifier is used to define a clip path, i.e. An area of a page or an image that may be selected to be visible, not visible, or have other alterations applied to it. The path may define areas other than simple rectangles. Rather, any complex shape may be defined by the path tag.

The <Degrade> identifier is used in the ARI tag to identify the manner by which an image quality of the associated image maybe degraded or enhanced based on the amount of money paid by the user of the image. For example, the quality of the image may be degraded by lowering the color depth, lowering the resolution, setting the image color output to black and white, blurring the image, cutting out part of the image, superimposing another image on top of the associated image, blacking out a portion of the image, and the like. Likewise, the quality of the image may be enhanced by removing some of these image effects based on an amount of money paid by the user of the image.

FIG. 5B is an exemplary embodiment of an ARI tag in accordance with the present invention. The ARI tag may be used with any type of tag including HyperText Markup Language (HTML) header tags, Frame tags, Object tags, Schema tags, Jscript tags, etc. A single ARI tag may apply to one or a plurality of components of a web page.

As shown in FIG. 5B, the ARI tag includes default access rights 530 associated with the ability to print, copy/paste, perform a printscreen operation, save, and display the content associated with the ARI tag. In the particular example shown in FIG. 5B, the default resolution of the image is set to 72 dots per inch (dpi), no printing of the content is permitted, copying of the image is not permitted, and saving the content to a local storage device on client devices is not permitted.

The access rights provided to a user may be general access rights, i.e. default access rights, that are provided to all users or may be tailored to the type of user requesting access to the content. For example, the ARI tag may define a first level or access rights that are provided to all users. Such access rights may include allowing the users to view an image in a low resolution mode. Similarly, such access rights may include allowing users to view the image or text but not copy, save or print the image or text.

In addition, the ARI tag may define other levels of access rights that are provided to various "special" types of users. For example, a user that has registered with a server may be provided with a second level of access rights that include a medium resolution mode and the ability to print copies of the images and text. Still further, a user that subscribes, e.g., pays a monthly fee, to the service provided by the server, may be given a third level of access rights. The third level of access rights may include a high resolution mode and the ability to copy, save and print the images and text from the web page.

Beyond the default access rights, the ARI tag may include information 540 identifying the manner by which the default access rights are modified based on the type of user requesting access to the associated content, in this case an image. In the particular example shown in FIG. 5B, the modifications to the default access rights are based on an amount of money paid by the user that requests access to the associated image. For example, if the user pays $0.01, the resolution of the image is increased to 360 dpi. If the user pays $0.10, the resolution is increased to 360 dpi and the user is allowed to print the image once. If the user pays $1.00, the resolution of the image is increased to a maximum resolution and printing, copying and saving the image is allowed.

The ability to upgrade the user's access level can be applied to any content and to any aspect of the content. Thus, images, text, sound and the like, may have their quality upgraded or degraded based on the user's access level, may have the functions that may be performed on the content modified based on the user's access level, and the like. As further examples, hidden fields may be made visible to users with a required access level, images and icons may be modified from still images and icons to animated images and icons based on a user's access level, and the like.

The user access level information may be stored in a data structure associated with the server on which the web page resides, on a client device in the form of a file, cookie or the like, or may be distributed across a plurality of servers and/or client devices. The user access level information data structure stores information for identifying a user and determining what access should be provided to that user in accordance with the ARI tag associated with the content requested by the user.

In addition, the user's access level may be determined dynamically based on whether or not the user changes his original access level in order to obtain greater access rights to the content associated with the ARI tag. For example, if the user agrees to pay a $1.00 charge for access to an image having the associated ARI tag shown in FIG. 5B, the user's access level is dynamically changed from a default access level to an access level in which printing, copying and saving are enabled and the resolution of the image is set to a maximum.

The ARI tags associated with the content of a web page are used with an ARI enabled web browser to control the use of web page content. The ARI enabled web browser includes either code in the web browser itself, in a plugin application, a web browser extension, or the like, that processes and implements the access rights identified in the ARI tags.

FIG. 6 is an exemplary block diagram of a web browser application in a client device in accordance with the present invention. As shown in FIG. 6, a client device 600 includes a network interface 605 which provides a communication pathway between the client device and the data network. Data is sent to and from the web browser application 610.

The web browser 610 may have one or more plugin applications 620 for extending the abilities of the web browser 610. The web browser 610, in the present invention, is enhanced by the inclusion of an ARI plugin application 630 in addition to any other plugin applications 620 that may be present. The ARI plugin provides the software necessary for processing of ARI tags in data received from source on the network. In a further embodiment, described in more detail hereafter, the ARI plugin application 630 may also provide an interface through which a user of the client device 600 can assign his/her own ARI tags to information sent out over the network.

As an example of how the present invention operates, assume that the client device 600 has transmitted a request for content to a server via the network interface 605. In response, the server sends the requested content to the client device 600 which receives it through network interface 605. This content is provided to web browser application 610 which parses the data to determine how to present the data on the client device 600.

In parsing the data, the web browser application 610 encounters the ARI tag embedded in the data. Encountering the ARI tag causes the web browser application 610 to invoke the ARI plugin application 630 which processes the ARI tag. In processing the ARI tag, the ARI plugin 630 enables and/or disables various operations and options that are available through the web browser application 610 interface. For example, such processing may involve disabling the ability to print web pages or portions thereof, disabling the "save as" option in pop-up menus, decreasing the resolution of an image in the content, and the like.

Based on the processing of the content by the web browser application 610 and the ARI plugin application 630, an output is sent to the client output device(s) 640. The output may be visual, audible, and even possibly tactile (such as with force-feedback devices). Each of the visual, audible and tactile portions of the output may be modified by the use of ARIs according to the present invention.

A user of the client device 600 may input access requests via an input interface 650 of the client device 600. Inputting the access request may include typing on a keyboard, pressing a mouse button, operating a pointing device, using a voice command and voice recognition software, and any other mechanism for inputting commands into a computing device.

The access request is passed to the ARI plugin 630 to determine whether the access request may be granted to the user in view of the ARI tag(s) in the content presented. Such a determination may include sending a request to a server for user access rights information for the user that input the access request. Based on the user access rights information received from the server and the ARI tag(s), the ARI plugin application 630 may determine whether this user may be granted the access requested. If so, the access is granted, e.g., the user may perform the copy operation requested or print the content as requested. If the access is not granted, the Web browser application 630 may provide the user with an output via the client output device(s) indicating that the user does not have the required authority to perform the requested actions or obtain the requested access.

As previously mentioned, rather than processing the ARI tags upon receipt of the content from the network, the present invention may alternatively, or in addition, process the ARI tags upon receiving an access request from a user. In such a case, the browser options may not be disabled, but when the user attempts to make use of an option that is not available due to the ARI tags, the user may be presented with a message indicating that he/she does not have access to that option.

In addition to the above, it should be noted that ARI tags themselves may not be secure without additional measures to ensure that they are not removed or that the web browser fails to follow the usage restrictions indicated in them. There are various mechanisms that may be used to ensure the security of the ARI tags in the content downloaded to a client device. For example, encryption, digital certificates, checksums, digital signatures, tamper detection algorithms, and the like may be implemented in association with the ARI tags of the present invention. Using one or more of these mechanisms, it is possible to determine when a user of a client device attempts to circumvent the ARI protections by modifying or removing the ARI tags in the content downloaded.

As an example, an MD5 checksum may be used with an ARI tag to ensure that the ARI tag has not been tampered with by the user or other party. In using an MD5 checksum, the checksum may be generated based on the text between the <ARI> and </ARI> tags:

<ARI MD5="26e91abc6d82a94f96af05316ba8ee01>
    <Save>NONE</SAVE>
    </ARI>

This checksum may then be used to verify the contents between the <ARI> and </ARI> tags.

Figure 7:
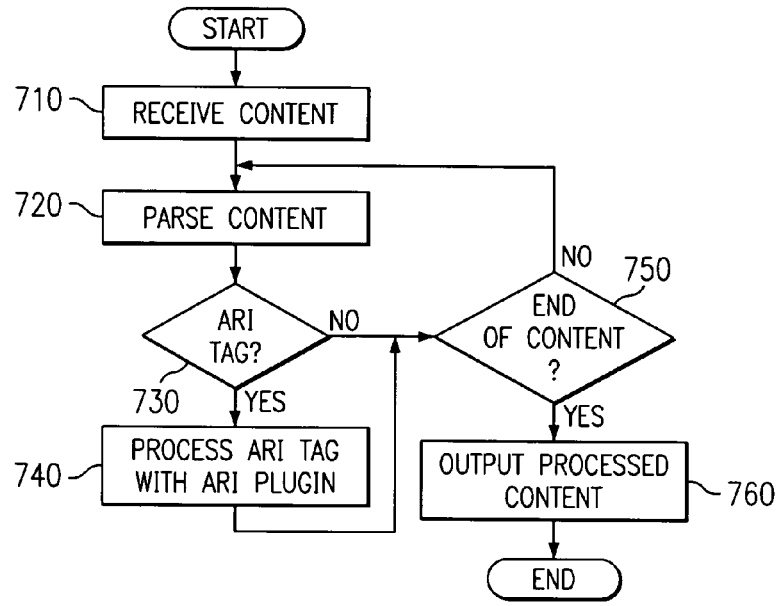
FIG. 7 is a flowchart outlining an exemplary operation of a browser application implementing the access rights information of the present invention.

FIG. 7 is a flowchart outlining an exemplary operation of the present invention when processing an ARI tag. The embodiment shown in FIG. 7 is that in which processing of the ARI tags is performed when the content is received by the web browser application. A similar operation may be performed in response to receiving an access request.

As shown in FIG. 7, the operation starts with receipt of content from a source over a network (step 710). The content is parsed by the web browser application (step 720). A determination is made as to whether an ARI tag is encountered (step 730). If an ARI tag is encountered, the ARI tag is processed by the ARI plugin application (step 740). The processing of the ARI plugin application may result in options and functions of the web browser application being enabled and/or disabled.

Thereafter, or if an ARI tag is not encountered, a determination is made as to whether the end of the content is encountered (step 750). If so, the processed content is output to one or more client device output devices (step 760) and the operation ends. If not, the operation returns to step 720.

Thus, the present invention provides an apparatus and method by which usage of computer accessible content may be controlled by the creator/owner of the content. In this way, a creator/owner of the content may control when, where, how, and to whom his/her works may be distributed and used.

In addition to controlling the usage of the associated content, ARI tags may be used to perform other functions in association with the usage of the content. For example, the ARI tags may include functionality for logging actions performed on the content, such as viewing, copying, printing, and the like. For example, if a user downloads content having an associated ARI tag and prints the content, the ARI tag may have functionality that reports back to a source of the content that the content was printed by this user. In this way, a log of the usage of the content may be maintained. The log may be used for billing purposes, statistical purposes, or the like.

As shown above, the ARI tag according to the present invention may be used to restrict usage of the content assciated with the ARI tag. In addition, as shown in the example ARI tag structure and ARI tag in FIGS. 5A and 5B, the ARI tag may also be used to relax various restrictions for users having a particular access level. This access level may be determined based on user profile information stored on the server from which the content was received, stored on the client device itself, or stored in a third party computing device.

The user profile may be retrieved based on user identification information provided by the client device. For example, the IP address of the client device, a device number associated with the client device, a user login identification, and the like may be used to identify a user when the user accesses the server and requests content from the server. Based on this information, the user's profile information may then be retrieved for use in determining the user's access level.

In addition, as previously mentioned with regard to FIGS. 5A and 5B, the user's access level may be determined dynamically based on an interaction with the user at the time that the user requests access to the content. For example, if the ARI tag indicates that there are varying levels of access, such as a default level and one or more optional access levels, the web browser may provide an interface through which a user may choose to change his/her access level.

Figure 8:
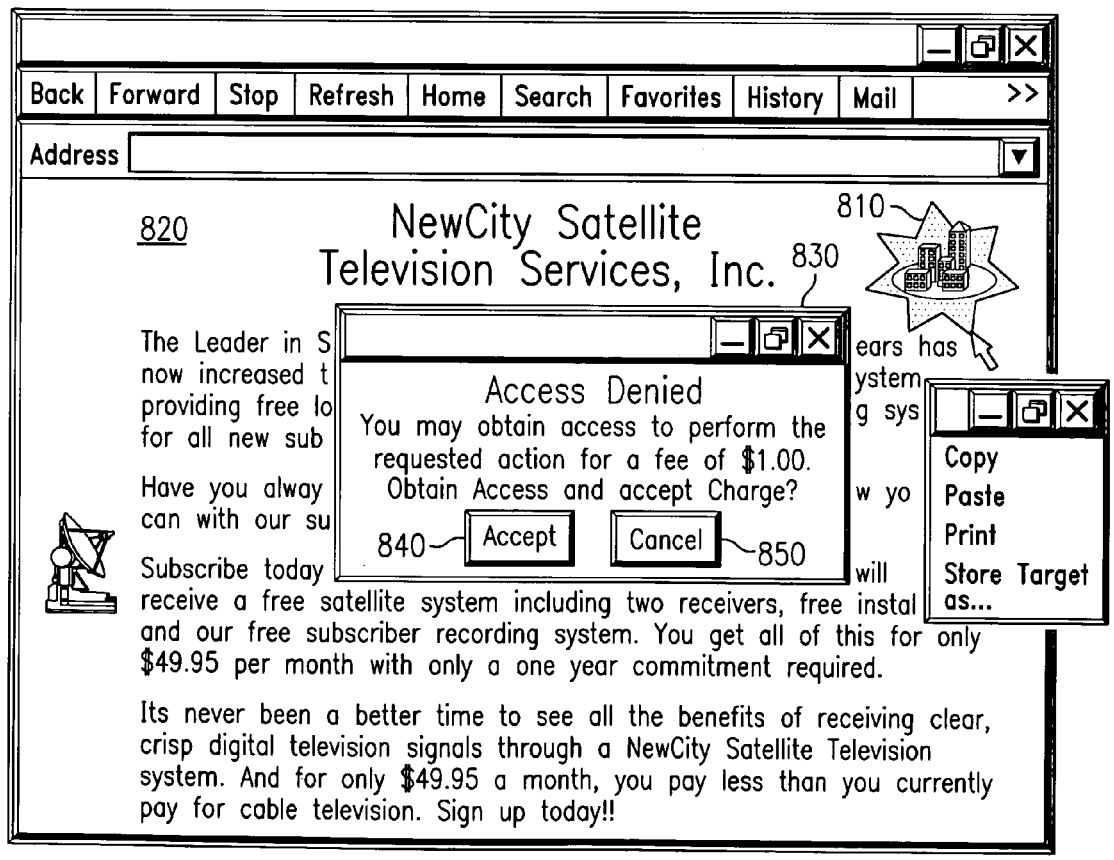
FIG. 8 is an example of a web browser interface according to the present invention.

FIG. 8 is an example of the above web browser interface. In the example shown in FIG. 8, assume that a user requests access to an image 810 downloaded in an HTML document 820 from a server. Also assume that the image 810 has an associated ARI tag which identifies a default level of access, a medium level of access, and a high level of access.

If the user attempts to perform a particular action on the image, e.g., printing or copying the image, the default level of access may restrict such actions. At the time the user attempts this action, the web browser may, based on the access levels identified in the ARI tag, provide an interface 830 that indicates that the user does not have sufficient access to perform that action but, for a fee of $1.00, the required access may be obtained. The user may then be provided with the option, e.g., via virtual buttons 840 and 850, of paying the $1.00 fee or canceling the requested action. The payment of the $1.00 fee may further require entry of account information to which the $1.00 fee may be charged. If the user chooses to pay the fee, the user's access level may then changed to the new access level and the associated functions are then enabled in accordance with the access rights identified in the ARI tag.

In an alternative embodiment, the access level information in the ARI tag may be used to inform the user of the amount of money that will be charged to his/her account if the user chooses to complete a requested access request. In this alternative embodiment, rather than changing the user's access level, the requested access is permitted in exchange for the associated fee without increasing the user's access level with regard to other types of access to the associated content.

For example, printing an image may have an associated charge. This charge may be variable based on the quality of the image, as defined in the ARI tag. For example, if the user wishes to print an image that has a resolution of 72 dpi, the charge may be $0.05. However, if the user wishes to print an image with a resolution of 360 dpi, the charge may be defined to be $0.25.

The particular charges are defined in the ARI tag associated with the content. If a user requests access to the content, e.g., requests a printout of an image, the web browser may provide an interface based on the ARI tag that indicates that a hard copy of the image may be obtained for a charge of $0.25 to the user's account. The user may also be provided with options to either accept the charge or cancel the access request.

Thus, in this alternative embodiment, the requested access is provided in exchange for the requisite fee. However, the user's access level is not increased in order to provide the requested access.

The ARI tags of the present invention, and the ability to define various levels of access, may be equally applied to other forms of content rather than only content downloaded from a server, e.g., web pages, HTML documents, and the like. For example, the ARI tags of the present invention may be used with an electronic mail program and may be applied to electronic mail messages and the like. That is, the ARI tags may be associated with an electronic mail program that is distributed free of charge to users. The user's access level will dictate the quality of the electronic mail message and any attachments to the electronic mail message. In this way, various levels of electronic mail service may be provided to a user based on the type of user. For example, a low quality electronic mail service may be provided free of charge to all users. However, users may choose to upgrade the electronic mail service based on whether they are willing to pay a fee for the higher quality electronic mail service.

For example, if the user has a low access level, the ARI tag may indicate that the electronic mail message may only use Courier font, may not have any specialized stationery, and any images attached to the electronic mail message will have their quality degraded to 72 dpi. However, if the user pays a fee to have a medium level of electronic mail service, the ARI tags of the present invention may allow the user to access a limited number of specialized stationeries and fonts in composing an electronic mail message, and the images may have their resolution increased to 360 dpi.

The electronic mail message will then have an associated ARI tag that indicates the restrictions on the quality of the electronic mail message imposed by the access level of the user that created the electronic mail message or the user that receives the electronic mail message. In the case where the quality of the electronic mail message, and any attachments thereto, is controlled by the access level of the user that created the electronic mail message, when the recipient of the electronic mail message attempts to view the electronic mail message using his/her own electronic mail program, the quality of the electronic mail message cannot be increased beyond that established during creation of the electronic mail message. However, in the case where the quality of the electronic mail message is controlled by the access level of the recipient of the electronic mail message, the recipient may be provided with an opportunity to upgrade the quality of the output of the electronic mail message. The upgrading may be based on the recipient performing some action or paying for an increased access level, as described above.

While the above interface for upgrading a user's access level is described in terms of a window with virtual buttons, the present invention is not limited to such. Rather, any interface may be used without departing from the spirit and scope of the present invention. For example, a "continuous spectrum" type user interface may be used through which a user may select an access level by adjusting the user interface to a level that the user desires.

That is, for example, a slider bar may be provided through which the user may adjust the position of the element in the slider bar to a location associated with a desired access level. As the user adjust the position of the element, associated text may be displayed informing the user of the type of access provided at the access level associated with the position of the element and the associated cost for obtaining that access level. Other types of interfaces may also be used without departing from the spirit and scope of the present invention.

In addition to defining the amount of money that is charged to obtain access to associated content, the ARI tags of the present invention may be used to define the amount of money, credits, points, etc. that is earned by a user that accesses the associated content. The user of ARI tags in this context is particularly suitable with, for example, advertisements such as banner ads and the like.

For example, the ARI tag of the present invention may be associated with a banner ad that is displayed with a web page downloaded to a client device. The ARI tag may contain information indicating that if the user of the client device clicks on the banner ad, the user of the client device will be awarded 5 credits which will be placed in the user's account. The user may then use these credits at a later time to "pay" for access to content protected by ARI tags as set forth above.

Alternatively, the ARI tag may be used as a mechanism for gate keeping access to associated content by requiring the user to "pay" for access by viewing or interacting with an advertisement or the like. For example, the ARI tag of the present invention may be associated with an image on a web page or the like. The image may be blacked out at first with a superimposed message indicating that the user can view the image if the user first views an advertisement. This initial display is as defined by the ARI tag default settings.

If the user clicks on the advertisement, the user is presented with the advertisement, redirected to an associated web site, or the like. Once the required viewing or interaction with the advertisement is complete, the user's access level may be temporarily increased, via the access levels defined in the ARI tag associated with the image, so that the user may view the image. In this way, the ARI tag defines the manner by which a user may earn access to associated content.

This same mechanism may be applied to electronic mail as well. Currently, a business provides free electronic mail service to users however, the business inserts an advertisement into each electronic mail message. While this may be an effective way of paying for the electronic mail service initially, astute users teach themselves to ignore the advertisements when they read electronic mail messages.

With the present invention, however, the electronic mail message may have an associated ARI tag that defines the manner by which the user may earn access to the associated electronic mail message. For example, the ARI tag may indicate that the user must click on and view an advertisement before access is provided to the electronic mail message. The level of the user's interaction with the advertisement or an associated advertiser's web page may be configurable using the access levels defined in the ARI tag. In this way, the action of clicking on and viewing an advertisement "pays" for the user's use of the electronic mail service.

Figure 9A:
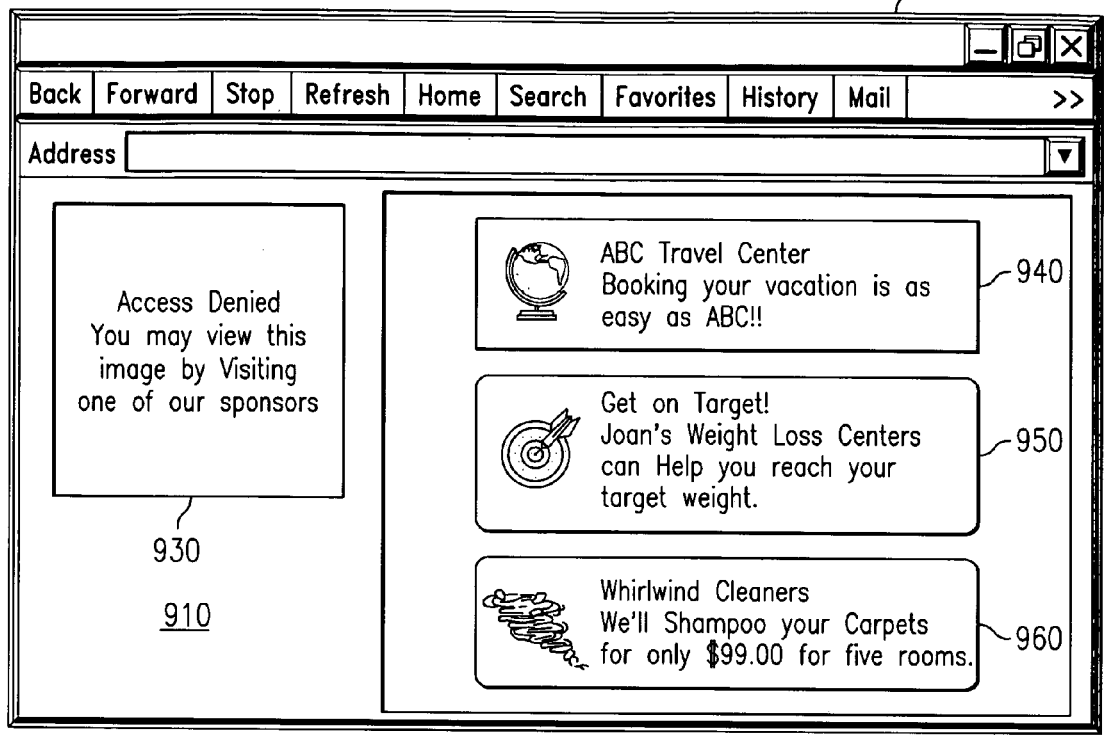
FIGS. 9A–9B are exemplary diagrams illustrating an embodiment of the present invention in which ARI tags are used to define the manner by which a user earns access to associated content.
Figure 9B:
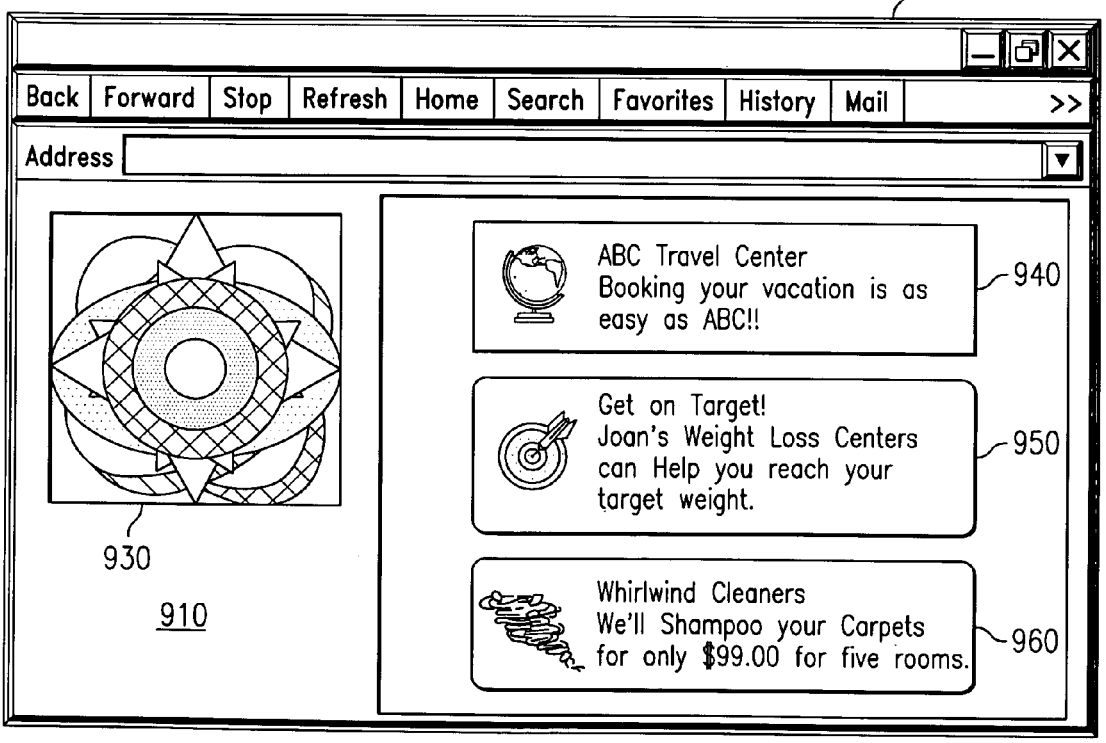

FIGS. 9A–9B are exemplary diagrams illustrating an embodiment of the present invention in which ARI tags are used to define the manner by which a user earns access to associated content. As shown in FIG. 9A, a web page 910 is downloaded to a web browser application 920 on a client device. The web browser application is ARI enabled so that it has code built into the browser code or a plugin application that handles various types of ARI tags.

The web page 910 includes an image 930 to which access rights are assigned using an ARI tag according to the present invention. When the web page 910 is received by the browser application 920, the browser application 920 parses the web page HTML code and identifies an ARI tag being present in the HTML code. Upon detecting the ARI tag, the browser application 920 invokes the ARI code or plugin to handle the ARI tag.

The ARI code parses the ARI tag to determine what access rights are available to the user. This may involve determining a user access level as previously discussed above. In the particular example shown in FIG. 9A, the ARI tag indicates that the user is first presented with a default view of the associated image which comprises a blacked out image with a superimposed message indicating that access to the image may be obtained by clicking on one of the advertisements present on the web page.

In addition, the advertisement images 940–960 present on the web page 910 have associated ARI tags that indicate that the user will earn access to images on the web page 910 when they click on and view the advertisement and/or a web site associated with the advertisement. If the user clicks on one of the advertisements 940–960, the web browser application 920 may open an additional window in which an associated web site home page of the advertiser is displayed. Thereafter, when the user returns to the web page 910, the web page 910 is refreshed with the image being displayed, as shown in FIG. 9B.

Figure 10A:
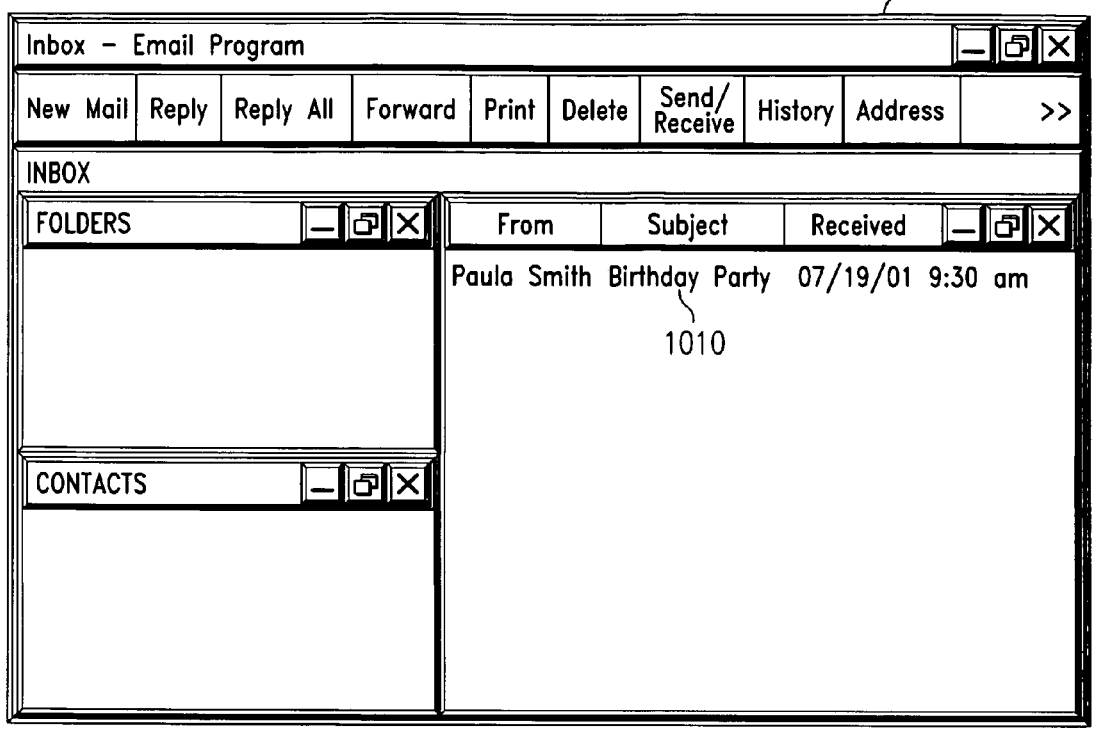
FIGS. 10A and 10B illustrate an embodiment of the present invention as applied to an electronic mail message.
Figure 10B:
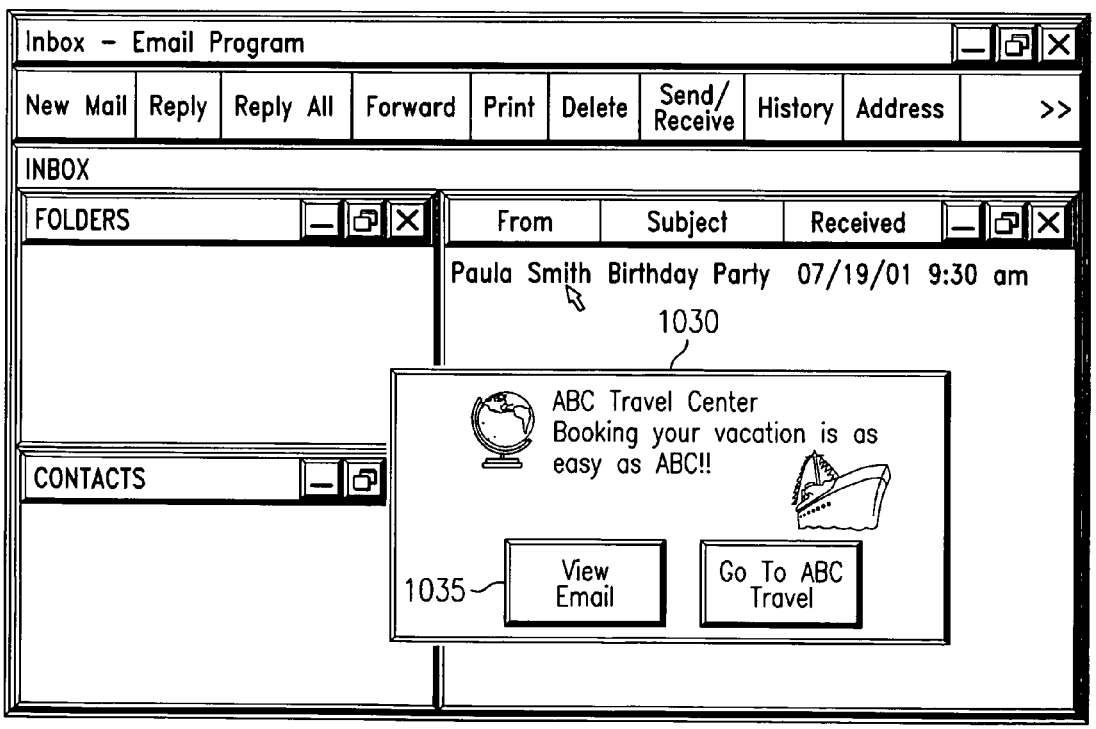

FIGS. 10A and 10B illustrate an embodiment of the present invention as applied to an electronic mail message. As shown in FIG. 10A, an electronic mail message 1010 may be received by an electronic mail application 1020 present on a client device. The electronic mail application 1020 is ARI enabled so that it contains code or plugin applications that handle ARI tags.

When the electronic mail message 1010 is received by the electronic mail application 1020, the electronic mail application 1020 applies an ARI tag to the electronic mail message 1010. When a user clicks on an electronic mail message 1010 in the electronic mail application 1020, the electronic mail application 1020 processes the ARI tag and displays an advertisement 1030 to the user, as shown in FIG. 10B. The advertisement 1030 may include a virtual button 1035 or the like, through which the user may obtain access to the associated electronic mail message 1010. In this way, the user must view the advertisement 1030 prior to gaining access to the electronic mail message 1010. Thus, the user "pays" for the electronic mail service by viewing advertisements, as defined by the ARI tags associated with the electronic mail messages. The ARI tags may also be attached to outgoing electronic mail messages such that recipients of the electronic mail messages sent by the user must view advertisements in order to read the electronic mail messages.

In addition to the above, the same functionality may be applied to users that wish to send electronic mail messages as well. For example, with the present invention, a user may wish to compose an electronic mail message and send it to a recipient. The act of composing the electronic mail message may require, based on access rights information associated with the electronic mail program, that the user view an advertisement, pay a fee, or the like. In addition, the user may be provided with access to a limited number of functions within the electronic mail program based on the user's access level. For example, the user may only be able to use Courier font, a white background, and may be limited to the size of attachments that may be added to an electronic mail message. For users with a higher access level, for example, access to 10 different font types, 5 different background patterns, and a higher attachment size limit may be provided.

Thus, the present invention provides a mechanism through which access to content may be controlled based on the user "paying" for access to the content by either submitting monetary compensation or by performing some desired action, such as viewing an advertisement or the like. The access rights information of the present invention may be applied to any content, including web pages, electronic mail messages, electronic mail programs, web browsers, and the like, to thereby control access to content in this manner.

The above descriptions of the exemplary embodiments are directed to the application of ARI tags to sections of a document or the entire document. The present invention, however, is not limited to such. Rather, the ARI tags of the present invention may be applied to fields within documents, forms, and the like. In such a context, the ARI tag is used to control access to information entered into the associated field.

Figure 11:
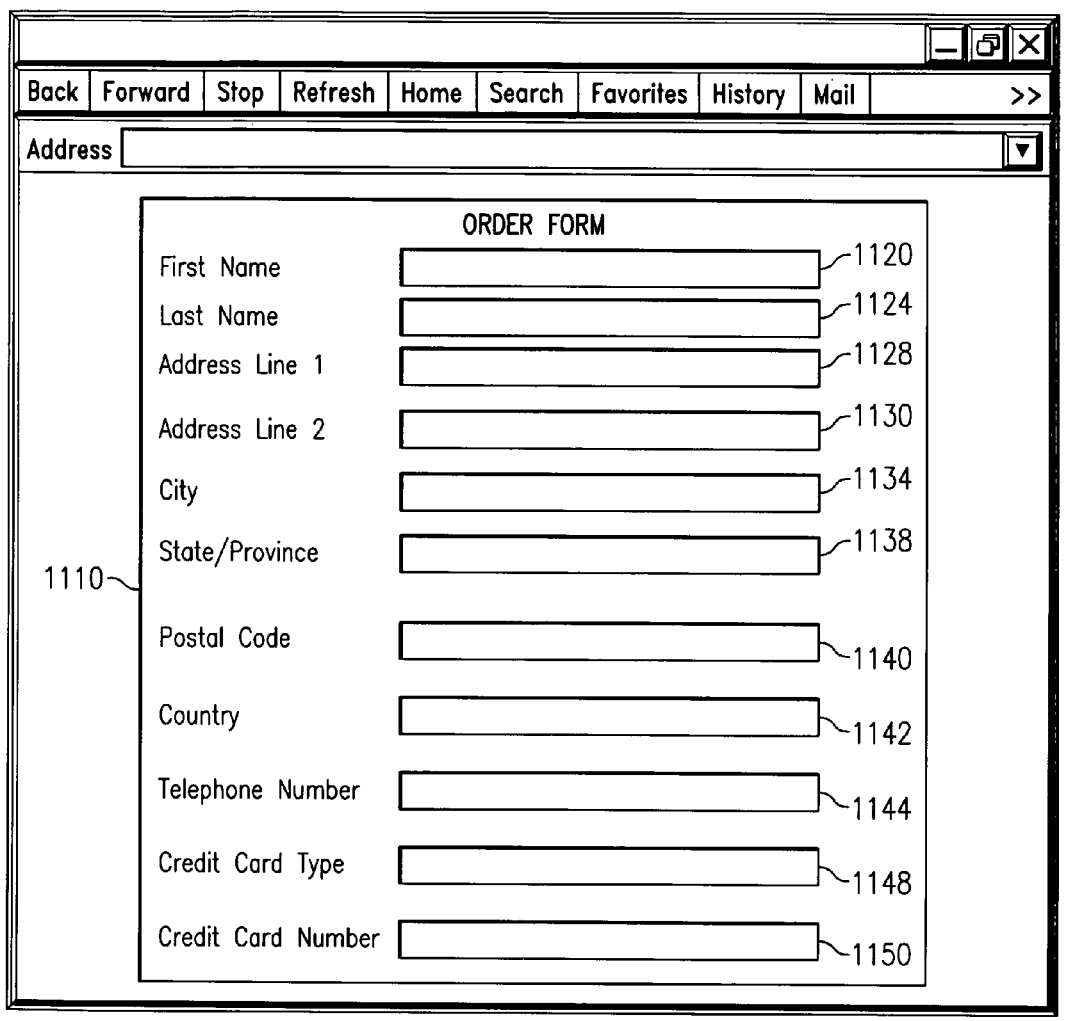
FIG. 11 is an exemplary diagram of an on-line form that may be used by web sites to obtain information about users of the web site.

FIG. 11 is an exemplary diagram of an on-line form that may be used by web sites to obtain information about users of the web site. The form 1110 contains a plurality of fields 1120–1150 in which the user may enter personal information, such as the user's name, address, telephone number, credit card number, and the like. These fields 1120–1150 may have associated ARI tags provided by the supplier of the form 1110. Alternatively, the user may attach an ARI tag to a field when returning the form to the web site such that the user defines the manner by which the web site may make use of the information provided by the user.

In such a case, the web browser application that is used by the user may have a functionality for attaching ARI tags to fields such that the user may define an ARI tag, select a field in the form 1110, and select a virtual button for attaching the ARI tag to the field to thereby associate the ARI tag to the selected field. Once the user defines the ARI tag and attaches it to a field, the ARI tag code is inserted into the HTML code of the form in a position associated with the selected field. In this way, access to the user's entry in the associated field is controlled based on the ARI tag.

Since the ARI tag is defined by the user and is attached to the field entry by the user, it is necessary to have a mechanism for identifying user defined ARI tags. Such a mechanism may take the form of standardized ARI tags, standard ARI tag components wherein the values of these components are set by the user, or an ARI tag repository such as a third party repository. In the latter case, a user may register with the third party repository and store user defined ARI tags there for use with form entries. When a web site receives a filled-out form from a user, wherein the filled-out form includes field entries having associated ARI tags, the web site may query this third party to obtain information regarding how to process the ARI tag, for example.

For example, a user may download a form from a web site, such as that shown in FIG. 11, in order to complete an on-line purchase. The user may then enter his/her name, address, telephone number, credit card number, and the like, into the fields 1120–1150. The user may then attach an ARI tag to the user's credit card number entry in the field 1150. The form may then be sent back to the web site server when the user selects the "submit" virtual button. When the form is sent back to the web site server, the form will include the ARI tag attached to the credit card number field 1150. The web site server may then only make use of the credit card information entered into field 1150 in accordance with the ARI tag attached to it. For example, the web site server may be able to use the credit card information once so that the purchase transaction may be completed, however, the credit card information cannot be used again by the web site server.

Thus, the ARI tags of the present invention may not only be used with documents and sections of documents downloaded from web servers, the ARI tags may also be used with fields within documents. In this way, the supplier of information in the fields of these documents may dictate the manner by which the information submitted may be used.

The above embodiments describe the present invention in which ARI tags are used to dictate access to associated content. The functionality of the ARI tags described above may be provided using different mechanisms than tags. For example, the ARI tag functionality may be incorporated into metadata of files, file headers, and the like. As a further embodiment of the present invention, an embodiment of the invention will be described in terms of the access rights information being incorporated into metadata of a file.

Metadata is data about data. Typically metadata is used to describe the data that is associated with the metadata and to provide additional information about the associated data to applications that process the data. In the OS/2 environment, hidden metadata is stored in a separate location of the filesystem and is associated with a data file. This type of metadata is sometimes referred to as extended attributes.

Some filesystems support the use of metadata and others do not. For filesystems that support the use of metadata, the present invention may be incorporated into the metadata to thereby control access to the associated data.

A filesystem is an application that manages the use of files in a computing system. The operating system of the computing system generally queries the filesystem for information when processing files in the computing system. Thus, when an application attempts to perform a function on a file in the computing system, the function is passed to the operating system which in turn queries the filesystem for information regarding the file. Based on this information, the operating system may perform the desired function on the file.

With the present invention, metadata is associated with files in a computing system. These files may be documents, images, or any other content whose access is to be controlled. The metadata includes the access rights information previously described. The metadata is read by the filesystem when the filesystem is queried for information about the file by the operating system.

The filesystem of the present invention is preferably augmented to include ARI processing. That is, the filesystem is capable of reading the ARI in the metadata and determining access restrictions based on the ARI and the user's access level. The user's access level may be obtained, for example, from a locally or remotely stored user profile. The user profile may be identified based on login information supplied by the user when the user logs onto the system.

Thus, as shown in FIG. 12, when an application 1210 attempts to perform a function on a file 1215 in the computing system, the operating system 1220 must query the filesystem 1230 to perform the function. The filesystem 1230 retrieves the metadata 1240 for the file and processes it. The metadata 1240 includes the access rights information of the present invention therein. When the filesystem 1230 processes the metadata 1240, the filesystem 1230 also retrieves the user access level information from the user profile 1250. Based on the user access level information and the access rights information in the metadata 1240, the filesystem 1230 determines the access rights that are to be provided to the user. The filesystem 1230 may then compare the requested function to the access rights that are provided to the user to determine if the function may be allowed under the user's access rights. If so, the function is performed. If not, a message may be returned to the user indicating that he/she does not have sufficient access to perform the function.

In some computing environments, the filesystem is actually installable from a remote device. With such a computing environment, the installation of the filesystem may be modified to include a user login when the filesystem is installed. Based on this user login, a corresponding user profile may be retrieved that designates the user's access level for use with the access rights information of the present invention.

Once the filesystem is access rights enabled, i.e. Has the functionality to read access rights information and process it from metadata, the filesystem may be extended to include HTML data in the metadata as well. That is, the filesystem may be provided with the capability to parse and interpret HTML code in the metadata by using, for example, a web browser application or the like. In this way, files having ARI tags may be downloaded from sources over a network and have the ARI tags stored as HTML metadata files in association with the content files themselves. In addition, embedded scripts, such as Java Script or Java can be included in the ARI tags and executed using the filesystem. For example, readme information may be embedded in the filesystem for an executable file as a metadata file or extended attribute. Users may then have the ability to view the readme information for that executable file by launching Netscape to view the HTML readme text.

Thus, the present invention may be implemented in metadata associated with files rather than only as ARI tags associated with documents, sections of documents, images and the like. By implementing the access rights information in the filesystem of computing devices and designating the access rights information in metadata of files, computing systems that do not support the use of ARI tags may still be able to have the functionality of the present invention to thereby control the access of users to various files on the computing system.

As previously mentioned, not all filesystems support the use of metadata to obtain information about files in the computing system. Furthermore, in the OS/2 environment, for example, when a file is copied to a filesystem that does not support extended attributes, i.e. hidden metadata, often the extended attributes are discarded during the copy procedure. In such filesystems, the ARI tag functionality of the present invention may still be provided by incorporating the access rights information into file headers.

A file header is usually the first record, although it may include or be another record different from the first record, in a disk or tape file and is used for identification (name, date of last update, etc.), and to describe the structural layout of the contents of the file. The present invention expands the use of the file header so that it can incorporate access rights information and be used by the filesystem, web browser, or the like, to determine access rights to the file contents.

When the file is read, the file header is first processed by the filesystem, browser, or the like, to determine the identification and structural layout of the file. In addition, with the present invention, the file header is processed by the filesystem to determine the access rights information associated with the file. Based on this access rights information and a user's access level, which can be obtained using any of the previously mentioned mechanisms, the filesystem can determine the access rights to be provided to the user. These access rights may then be used, as previously described, to control the manner by which the user may make use of the file.

For example, FIG. 13A illustrates a standard bitmap file. As shown in FIG. 13A, the bitmap file consists of a bitmap file header 1310, a color table 1320, and the bitmap bits 1330. The bitmap file header includes a pointer 1315 to the first bit in the bitmap bits section of the bitmap file.

FIG. 13B illustrates the same bitmap file augmented to include the access rights information of the present invention. As shown in FIG. 13B, with the present invention, the same bitmap file will consist of the previous bitmap file header 1310, the previous color table 1320, the access rights information 1340 of the present invention, and then the bitmap bits 1330. Because the bitmap file header includes a pointer 1315 to the start of the bitmap bits, the inclusion of the access rights information does not affect backwards compatibility.

For example, when inserting the access rights information into the file header, the pointer to the file data may be incremented by 1K and an additional pointer pointing back to ARI data may be provided. The ARI tag may then be inserted into this "opening" in the file header created by the two pointers.

Thus, the present invention may also be implemented in file headers without departing from the spirit and scope of the present invention. By inserting the access rights information in file headers, computing systems that do not support metadata or ARI tags may still be able to make use of the ARI functionality of the present invention.

Moreover, by inserting the access rights information in the file header, the access rights information becomes a part of the file. As such, it may be encrypted or otherwise secured in the same manner that the file is secured. Because the access rights information is part of the file, it is transferred to computing systems when the file is transferred. Thus, it becomes more difficult for users to detach the access rights information from the file.

In addition, while the above exemplary embodiment describes the ARI data being inserted into the file header, the present invention is not limited to such. Rather, the ARI data may be inserted anywhere in the file so long as measures are taken to identify its location relative to the file data. For example, the ARI data may be inserted after the file data.

Thus, the present invention provides a mechanism by which the usage of content may be controlled through the defining of access rights and the association of access rights information with the content. The access rights information may be associated with the content by way of ARI tags, may be included in metadata associated with content files, or may be included in the files themselves as part of the file header. The access rights information may define the various ways in which the content may be used, may define the manner by which a user obtains different types of access to the content and may even be used to define the way in which a user is rewarded for accessing the content.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of controlling access to content, comprising:
   receiving the content and access rights information associated with the content;
   processing the access rights information to determine allowable access to the content;
   receiving a request to perform a function on the content;
   determining if the function may be performed on the content based on the allowable access; and
   providing an interface based on the access rights information if the function cannot be performed on the content, wherein the interface provides information regarding how to obtain allowable access to perform the requested function and the interface is automatically provided to a user, responsive to the determining if the function may be performed on the content, without subsequent user action by the user.

2. The method of claim 1, wherein the access rights information is received in conjunction with the content, and the received access rights information includes information regarding how the user may modify the user's access level and thereby change the allowable access.

3. The method of claim 2, wherein the interface provides a mechanism through which the user may modify the user's access level to thereby change the allowable access.

4. The method of claim 3, wherein the user's access level may be modified by one of payment of a fee and performing an action.

5. The method of claim 4, wherein performing an action includes selecting an advertisement.

6. The method of claim 4, wherein payment of a fee includes providing account information to which the fee is charged.

7. The method of claim 3, further comprising:
   receiving an input via the interface to modify the user's access level;
   modifying the user's access level based on the input and the access rights information; and
   determining the allowable access based on the modified user's access level.

8. The method of claim 1, wherein the interface includes an option to accept a monetary charge for completion of the requested function.

9. The method of claim 1, wherein the method is implemented in a web browser application.

10. The method of claim 1, wherein the method is implemented in an electronic mail application.

11. The method of claim 1, wherein request for access to the content is a request to perform at least one of printing, copying, storing, viewing, and opening the content.

12. The method of claim 10, wherein providing an interface based on the access rights information is performed in response to a selection of an electronic mail message.

13. A computer program product in a computer readable medium for controlling access to content, comprising:
   first instructions for receiving the content and access rights information associated with the content;
   second instructions for processing the access rights information to determine allowable access to the content;
   third instructions for receiving a request to perform a function on the content;
   fourth instructions for determining if the function may be performed on the content based on the allowable access; and
   fifth instructions for providing an interface based on the access rights information if the function cannot be performed on the content, wherein the interface provides information regarding how to obtain allowable access to perform the requested function and the interface is automatically provided to a user, responsive to the fourth instructions for determining if the function may be performed on the content, without subsequent user action by the user.

14. The computer program product of claim 13, wherein the access rights information is received in conjunction with the content, and the received access rights information includes information regarding how a the user may modify the user's access level and thereby change the allowable access.

15. The computer program product of claim 14, wherein the interface provides a mechanism through which the user may modify the user's access level to thereby change the allowable access.

16. The computer program product of claim 15, wherein the user's access level may be modified by one of payment of a fee and performing an action.

17. The computer program product of claim 16, wherein performing an action includes selecting an advertisement.

18. The computer program product of claim 16, wherein payment of a fee includes providing account information to which the fee is charged.

19. The computer program product of claim 15, further comprising:
   sixth instructions for receiving an input via the interface to modify the user's access level;
   seventh instructions for modifying the user's access level based on the input and the access rights information; and
   eighth instructions for determining the allowable access based on the modified user's access level.

20. The computer program product of claim 13, wherein the interface includes an option to accept a monetary charge the completion of the requested function.

21. The computer program product of claim 13, wherein the computer program product is executed in a web browser application.

22. The computer program product of claim 13, wherein the computer program product is executed in an electronic mail application.

23. The computer program product of claim 13, wherein the request for access to the content is a request to perform at least one of printing, copying, storing, viewing, and opening the content.

24. The computer program product of claim 22, wherein the fifth instructions for providing an interface based on the access rights information are executed in response to a selection of an electronic mail message.

25. An apparatus for controlling access to content, comprising:
   a network interface;
   an access rights information processing unit coupled to the network interface; and
   a user interface coupled to the access rights information processing unit, wherein the access rights information processing unit receives the content and access rights information associated with the content via the network interface, and processes the access rights information to determine allowable access to the content, and
   wherein the user interface receives a request to perform a function on the content, determines if the function may be performed on the content based on the allowable access, and provides an access interface based on the access rights information if the function cannot be performed on the content, wherein the access interface provides information regarding how to obtain allowable access to perform the requested function and the access interface is automatically provided to a user, responsive to the user interface determining if the function may be performed on the content, without subsequent user action by the user.

26. The apparatus of claim 25, wherein the access rights information is received in conjunction with the content, and the received access rights information includes information regarding how the user may modify the user's access level and thereby change the allowable access.

27. The apparatus of claim 26, wherein the access interface provides a mechanism through which the user may modify the user's access level to thereby change the allowable access.

28. The apparatus of claim 27, wherein the user's access level may be modified by one of payment of a fee and performing an action.

29. The apparatus of claim 28, wherein performing an action includes selecting an advertisement.

30. The apparatus of claim 27, wherein payment of a fee includes providing account information to which the fee is charged.

31. The apparatus of claim 27, wherein the user interface receives an input via the access interface to modify the users access rights, and wherein the access rights information processing unit modifies the user's access level based on the input and the access rights information and determines the allowable access based on the modified user's access level.

32. The apparatus of claim 25, wherein the access interface includes an option to accept a monetary charge for completion of the requested function.

33. The apparatus of claim 25, wherein the apparatus operates in conjunction with a web browser application.

34. The apparatus of claim 25, wherein the apparatus operates in conjunction with an electronic mail application.

35. The apparatus of claim 34, wherein the user interface provides an access interface based on the access rights information in response to a selection of an electronic mail message.

36. The apparatus of claim 25, wherein the request for access to the content is a request to perform at least one of printing, copying, storing, viewing and opening the content.

* * * * *